US011543066B2

(12) United States Patent
Broadley et al.

(10) Patent No.: US 11,543,066 B2
(45) Date of Patent: Jan. 3, 2023

(54) COMPOSITE TUBE WITH A SACRIFICIAL LAYER FOR VERY THIN WALL HEAT EXCHANGERS

(71) Applicant: VIANT AS&O HOLDINGS, LLC, Tempe, AZ (US)

(72) Inventors: Mark W. Broadley, Downingtown, PA (US); John K. Eckert, Boyertown, PA (US); Ben Manderachi, Douglassville, PA (US); Dennis Willman, Reading, PA (US); Louis Loeper, Pottstown, PA (US)

(73) Assignee: VIANT AS&O HOLDINGS LLC, Foxborough, MA (US)

( * ) Notice: Subject to any disclaimer, the term of this patent is extended or adjusted under 35 U.S.C. 154(b) by 120 days.

(21) Appl. No.: 16/429,337

(22) Filed: Jun. 3, 2019

(65) Prior Publication Data
US 2019/0368649 A1 Dec. 5, 2019

Related U.S. Application Data

(60) Provisional application No. 62/679,082, filed on Jun. 1, 2018.

(51) Int. Cl.
*F16L 58/00* (2006.01)
*F28F 1/00* (2006.01)
(Continued)

(52) U.S. Cl.
CPC ............. *F16L 58/00* (2013.01); *B21C 37/06* (2013.01); *F16L 9/02* (2013.01); *F28F 1/00* (2013.01); *F28F 19/00* (2013.01); *B21C 1/22* (2013.01)

(58) Field of Classification Search
CPC ......... B21C 37/00; B21C 37/06; B21C 37/09; B21C 37/102; B21C 37/123;
(Continued)

(56) References Cited

U.S. PATENT DOCUMENTS

| 4,676,305 A | 6/1987 | Doty |
| 5,310,000 A | 5/1994 | Arterbury et al. |

(Continued)

FOREIGN PATENT DOCUMENTS

| GB | 1258141 | * | 1/1969 | ............. B21C 23/22 |
| WO | 2002101103 A2 | | 12/2002 | |
| WO | 2011041141 A1 | | 4/2011 | |

OTHER PUBLICATIONS

Perrin Walker and William H. Tarn. "Handbook of Metal Etchans". (Year: 1991).*

(Continued)

*Primary Examiner* — Jessica Cahill
*Assistant Examiner* — Smith Oberto Bapthelus
(74) *Attorney, Agent, or Firm* — Grossman, Tucker, Perreault & Pfleger, PLLC

(57) ABSTRACT

Composite tube assemblies and thin-walled tubing are disclosed. In embodiments, the composite tube assemblies include a functional tube and a sacrificial tube disposed within or around the functional tube. The sacrificial tube may be removed by exposure to a corrosive media, without substantially affecting the functional tube. Methods of forming composite tube assemblies and thin-walled tubing are also described.

19 Claims, 5 Drawing Sheets

(51) Int. Cl.
*F28F 19/00* (2006.01)
*F16L 9/02* (2006.01)
*B21C 37/06* (2006.01)
*B21C 1/22* (2006.01)

(58) Field of Classification Search
CPC .......... B21C 37/154; B21C 1/22; F16L 58/00; F16L 9/02; F16L 58/08; F28F 1/00; F28F 19/00
USPC ..................................................... 29/890.053
See application file for complete search history.

(56) References Cited

U.S. PATENT DOCUMENTS

| | | |
|---|---|---|
| 5,560,883 A | 10/1996 | Lane et al. |
| 6,050,301 A | 4/2000 | Yoshida et al. |
| 6,974,508 B1 | 12/2005 | Gabb et al. |
| 2006/0037660 A1* | 2/2006 | Kinnally ............. F16L 58/1054 138/143 |
| 2010/0193485 A1 | 8/2010 | Anukhin et al. |

OTHER PUBLICATIONS

International Search Report and Written Opinion dated Aug. 19, 2019 relating to corresponding application PCT/US2019/035139.
Extended Search Report in related European Application No. 19812609.6-1010, dated Jan. 26, 2022.

* cited by examiner

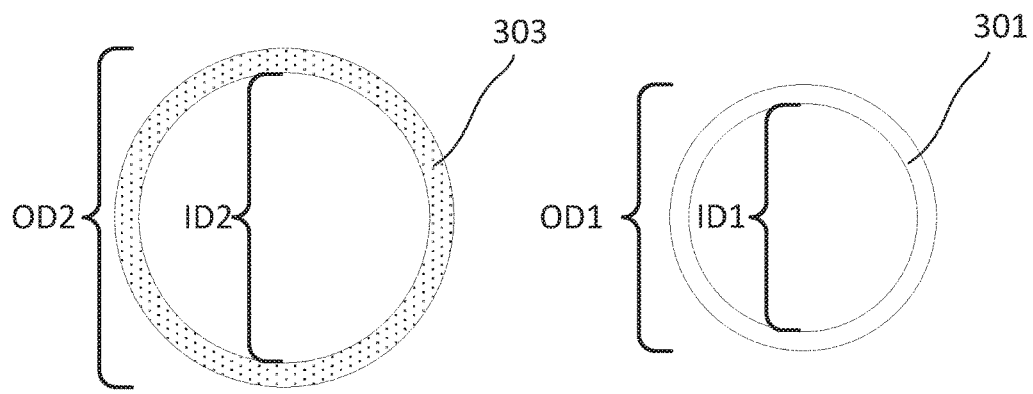
FIG. 3A
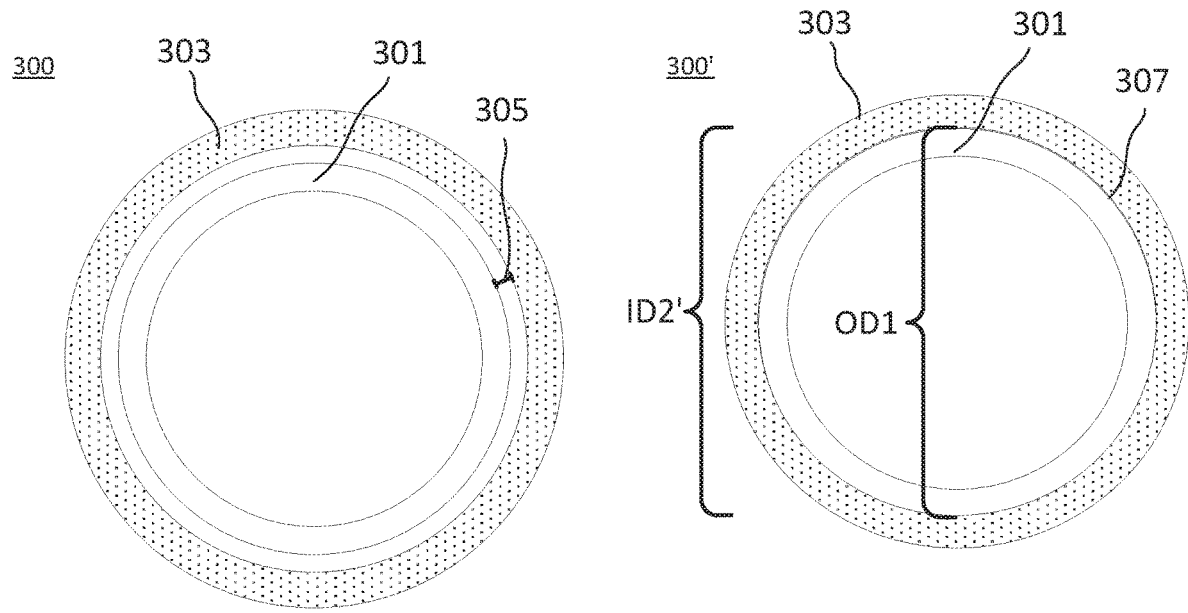
FIG. 3B
FIG. 3C

COMPOSITE TUBE WITH A SACRIFICIAL LAYER FOR VERY THIN WALL HEAT EXCHANGERS

TECHNICAL FIELD

The present disclosure generally relates to composite tube assemblies, thin-walled tubing, and methods of forming the same.

BACKGROUND

Interest has grown in the development of light weight, high flux heat exchangers for various applications. For example, single stage reusable near space air breathing flight vehicles that include light weight, high flux heat exchangers have been proposed for use in low cost manned space flight operations, e.g., to cool hot (e.g., ~1000° C.) inlet air at speeds of Mach 5 or higher. Proposed heat exchangers for such purposes are constructed using small diameter (e.g., 1 millimeter (mm) (~0.040 inch) Outside Diameter (OD)), very thin wall (e.g., 25 micron (µm) (0.001 inch)) superalloy tubes.

The dimensions and operating parameters required for such tubes present a variety of tube making challenges. For example, tube drawing of small diameter tubes generally requires highly specialized tube making skill and/or apparatus, even at relatively traditionally tube wall thicknesses (e.g., 75-250 µm (0.003 to 0.010 inch). As the tube wall thickness decreases below 75 µm (e.g., towards 25 µm), tube drawing often results in undesirable through-the-wall defects. Forming small diameter tubes by tube drawing long lengths using conventional lubrication and degreasing practices can also result in carbon or nitrogen contamination of the material used to form the tube—which may be undesirable for some applications.

Several methods exist for producing small diameter, thin-wall tubing, but are not without challenges. For example, bench drawing may be used to form small diameter, thin-wall tubing meeting the above noted specifications. However, the cost of bench drawing such tubing may be high, the production capacity may be limited, tube lengths are limited, and use of that process may entail significant scrap loss.

Small diameter, thin-wall tubing may also be made by coil drawing using a coil welding and tube sinking (drawing without internal diameter support) process. The product produced by such a process may suffer from through the wall defects, however, both at and away from the weld. It may also be difficult to use some materials (e.g., superalloys) in such a method, and the product may exhibit a rough surface with longitudinal defects.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIGS. 3A-3E stepwise illustrate one example of a method of forming a tube, consistent with the present disclosure.

DETAILED DESCRIPTION

Figure 1:
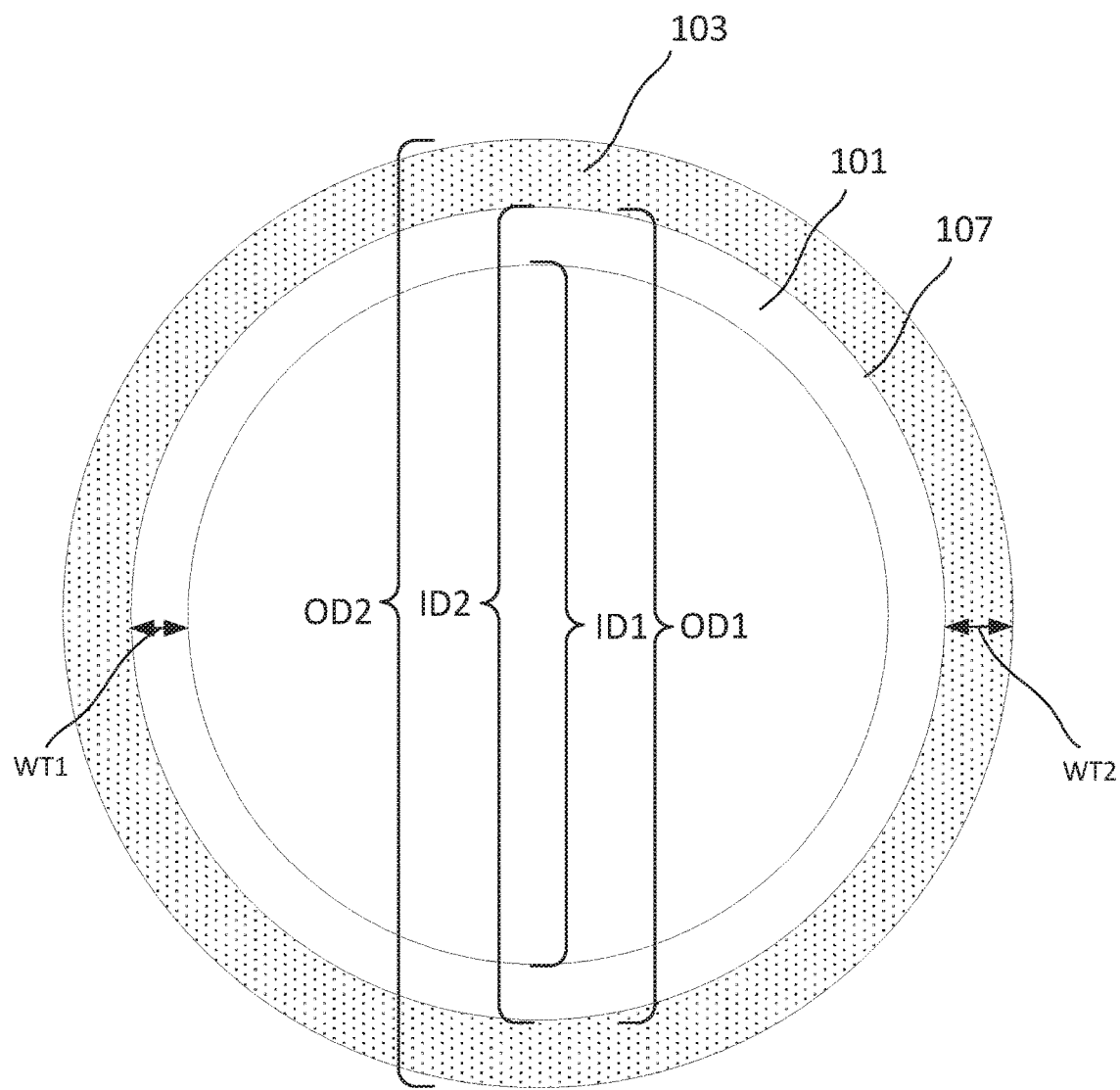
FIG. 1 is a cross sectional view of one example of a composite tube assembly including a functional tube and a sacrificial tube, consistent with the present disclosure.

The present disclosure generally relates to composite tube assemblies, thin-walled tubing, and methods of forming the same. In general, the composite tube assemblies of the present disclosure include an inner tube and an outer tube, wherein one of the inner and outer tube is a functional tube, and the other of the inner and outer tube is a sacrificial tube. Put differently, the composite tube assemblies described herein include a functional tube and a sacrificial tube, wherein the functional tube is disposed inside the sacrificial tube, or the sacrificial tube is disposed inside the functional tube. The composite tube assemblies described herein may be drawn into a drawn composite tube assembly that includes a drawn functional tube and a drawn sacrificial tube. Following drawing, the drawn sacrificial tube may be removed (e.g., by exposure to a corrosive media), leaving the drawn functional tube. As will be described in detail below, the composite tube assemblies and methods of the present disclosure enable the formation of a drawn functional tube while reducing, minimizing, or even eliminating the formation of through the wall defects in the drawn functional tube. Alternatively or additionally, the composite tube assemblies and methods of the present disclosure may limit or even prevent carbon and/or nitrogen contamination of the drawn tube.

As used herein, the term "compatible," when used in reference to a material of a sacrificial tube and/or a functional tube, means that the materials of the sacrificial tube and the functional tube do not form intermetallic compounds, voids, or other undesirable phases when they are heated while in contact with one another. The materials also respond in a similar fashion to the large plastic deformation (up to 70% reduction in area) and annealing steps (to remove the cold work from drawing) utilized in tube drawing.

As used herein, the term "corrosive media" refers to a compound or composition that will remove the material of a sacrificial tube, e.g., by corrosion, dissolution, or some other mechanism. Non-limiting examples of corrosive media include strong and weak acids, including but not limited to hydrochloric acid, hydrofluoric acid, nitric acid, phosphoric acid, sulphuric acid, metallic salts (e.g., ferric chloride), combinations thereof, and the like. In embodiments, the corrosive media is selected to selectively remove the material of a sacrificial tube, while not removing or not substantially removing a material of a functional tube. In that context, "not substantially removing" means that when a material of a functional tube is exposed to a corrosive media for a defined time and at a defined temperature (e.g., for 1 hour at room temperature), less than or equal to 1% by weight of the material of the functional tube is removed.

As used herein, the term "tube" refers to an elongated hollow object having an interior volume that is defined by at least one wall. For the sake of convenience and ease of understanding the present disclosure will describe various embodiments in which the term tube is used to refer to an elongated object having interior volume having a circular cross section. However, the tubes described herein are not limited to elongated objects that have an interior volume with a circular cross section. Rather, the term "tube" encompasses elongated objects having an interior volume that is defined by at least one wall, wherein the interior volume has any geometric or irregular cross section. Thus, the term "tube" encompasses elongated hollow objects having an interior volume with a geometric (e.g., circular, elliptical, oval, trigonal (e.g., triangular), quadrilateral (square, rhomboid, rectangular, etc.), pentagonal, hexagonal, etc., or irregular (e.g., non-geometric) cross section.

As used herein, the term "superalloy" means an alloy that contains at least one of nickel, cobalt, and/or iron, and which: has a yield strength of at least 550 megapascals (MPa); has an ultimate tensile strength of at least 1200 MPa; and in which one or more of such properties is maintained at temperatures at or above 760° C., or at temperatures greater than or equal to 70% of the absolute melting temperature of the alloy. Such alloys may also exhibit good creep resistance at such temperatures.

One aspect of the present disclosure relates to composite tube assemblies that include a functional tube and a sacrificial tube. Reference is therefore made to FIG. 1, which is a cross sectional view of one example of a composite tube assembly 100 consistent with the present disclosure. As shown, the composite tube assembly 100 includes a first functional tube 101 and a first sacrificial tube 103. For the sake of convenience and ease of understanding. FIG. 1 depicts an embodiment in which the first functional tube 101 is disposed inside the first sacrificial tube 103. Such a configuration is not required, however, and the relative position of the first sacrificial tube and the first functional tube may be reversed (i.e., the first sacrificial tube 103 may be disposed inside the first functional tube 101). Moreover while embodiments of the present disclosure include a single first functional tube and a single first sacrificial tube, multiple functional tubes (e.g., 1, 2, 3, 4, 5, or more) and/or multiple sacrificial tubes (e.g., 1, 2, 3, 4, 5, or more) may be used.

The first functional tube 101 is formed from a first material and the first sacrificial tube 103 is formed from a second material. In general, the first material is or includes a material that is selected to achieve desired physical properties in an end-product (e.g., a drawn functional tube), while remaining compatible with the second material and being resistant to a corrosive media that may be used to remove the second material. Non-limiting examples of suitable first materials that may be used include metals, metal alloys, combinations thereof, and the like. Suitable metal alloys include alloys that include nickel, iron, cobalt, or a combination thereof, either alone or in combination with other alloying elements. In embodiments, the first material is or includes a superalloy, such as a superalloy containing at least one of nickel, cobalt, and/or iron. Specific non-limiting examples of suitable alloys that may be used as or in the first material include one or a combination of two or more of the materials set out in Table 1 below:

TABLE 1

Example alloys for use as or in a first material

| Material Name | Nominal Composition (All numbers are in weight %) |
|---|---|
| Nickel Alloys | |
| Inconel 600 | ≥72% Ni (plus Co), 14.0-17.0% Cr, 6.0-10.0% Fe, ≤0.15% C, ≤1.0% Mn, ≤0.015% S, ≤0.5% Si, ≤0.5% Cu |
| Inconel 625 | ≥58.0% Ni, 20.0-23.0% Cr, ≤5.0% Fe, 8.0-10.0% Mo, 3.15-4.15% Nb (plus +Ta), ≤0.1% C, ≤0.5% Mn, ≤0.5 Si, ≤0.015% P, ≤0.015% S, ≤0.4% Al, ≤0.4% Ti, ≤1.0% Co |
| Inconel 718 | 50.0-55.0% Ni (plus Co), 17.0-21.0% Cr, 4.75-5.5% Nb (plus Ta), 2.8-3.3% Mo, 0.65-1.15% Ti, 0.2-0.8 Al, balance Fe, ≤1.0% Co, ≤0.08% C, ≤0.35% Mn, ≤0.35% Si, ≤0.015% P, ≤0.015% S, ≤0.006% B, ≤0.3% Cu |
| Inconel X750 | ≥70.0% Ni (plus Co), 14.0-17.0% Cr, 5.0-9.0% Fe, 2.25-2.75% Ti, 0.4-1.0% Al, 0.7-1.2% Nb (plus Ta), ≤1.0% Mn, ≤0.5% Si, ≤0.01% S, ≤0.5% Cu, ≤0.08% C, ≤1.0% Co |
| Haynes 282 | ≥57.0% Ni, 20.0% Cr, 10.0% Co, 8.5.0% Mo, 2.1% Ti, 1.5% Al, ≤1.5% Fe, ≤0.3% Mn, ≤0.15% Si, 0.06% C, 0.005% B |
| Cobalt Alloys | |
| MP35N | 33.0-37.00% Ni, 19.0-21.0% Cr, 9.0-10.5% Mo, 0.010% B, Balance Co, ≤0.02% C, ≤0.15% Mn, ≤0.015% P, ≤0.010% S, ≤0.015% Si, ≤1.00% Ti |
| Haynes L-605 | 10.0% Ni, 20.0% Cr, 15.0% W, 1.5% Mn, 0.1% C, ≤0.4% Si, 3.00% Fe, ≤0.030% S, ≤0.040% P, Balance Co |
| ELGILOY ® Alloy | 39.0-41.0% Co, 19.0-21.0% Cr, 14.0-16.0% Ni, 6.0-8.0% Mo, 1.5-2.5% Mn, Balance Fe, ≤1.2% Si, ≤0.15% C, ≤0.1% Be, ≤0.015% P, ≤0.015% S |

As noted above, the first sacrificial tube is formed from a second material. In general, the second material is or includes a material that is selected to facilitate drawing of the first functional tube into a drawn functional tube, while being compatible with the first material and being removable by exposure to a corrosive media. Non-limiting examples of suitable second materials include metals, metal alloys, and combinations thereof, such as but not limited to copper, copper alloys, nickel, nickel alloys that contain greater than 95% by weight (e.g., greater than or equal to 99% by weight) of nickel, thoria dispersed (TD) nickel, nickel molybdenum (NiMo) alloys, cobalt, cobalt alloys including one or more secondary elements (except chromium) that are present in the first material, iron, iron alloys (e.g., low carbon steel, iron nickel alloys), combinations thereof, and the like. In embodiments, the second material is or includes nickel or a nickel alloy when the first material is or includes a nickel super alloy. In other embodiments, the second material is or includes cobalt or a cobalt alloy when the first material is or includes a cobalt superalloy. In specific non-limiting embodiments, the second material is or includes one or more of the materials set out in Table 2 below.

TABLE 2

Example materials for use as or in a second material

| Material Name | Nominal Composition (All numbers are in weight %) |
|---|---|
| Nickel | 100% Ni (plus inevitable impurities) |
| Nickel 200 | ≥99.0% Ni, ≤0.25 Cu, ≤0.4 Fe, ≤0.35Mn, ≤0.15 C, ≤0.35Si, ≤0.01% S |
| Nickel 201 | ≥99.0% Ni, ≤0.25% Cu, ≤0.4% Fe, ≤0.35% Mn, ≤0.02% C, ≤0.35% Si, ≤0.01% S |
| Cobalt | 100% Co (plus inevitable impurities) |
| Copper | 100% Cu (plus inevitable impurities) |
| Iron | 100% Fe (plus inevitable impurities) |
| Low carbon steel | Steel containing 0.05-0.25 weight % C |

In embodiments, the first material is or includes a nickel superalloy (e.g., Haynes 282) and the second material is or includes TD nickel. In other embodiments, the first material is or includes a nickel superalloy (e.g., Inconel 625), and the second material is or includes nickel or a nickel alloy containing ≥95% by weight of nickel (e.g., Nickel 200).

As shown but not labeled in FIG. 1, the functional tube 101 has a first inner surface and a first outer surface, and the sacrificial tube 103 has a second inner surface and a second outer surface. In the illustrated embodiment, composite tube assembly 101 is configured such that functional tube 101 is disposed within the sacrificial tube 103. In such embodiments the first outer surface of the functional tube 101 contacts the first inner surface of the sacrificial tube 103, e.g., along an interface 107 therebetween. Similarly—in embodiments where the sacrificial tube 103 is disposed within the functional tube 101, the second outer surface of the sacrificial tube 103 may be in contact with the first inner surface of the functional tube, e.g., along a similar interface 107.

The functional tube 101 and the sacrificial tube 103 may be joined to one another in any suitable manner. For example, the functional tube 101 and sacrificial tube 103 may be joined to one another along an interface 107, e.g., by mechanical bonding, chemical (e.g., metallurgical) bonding, combinations thereof, and the like. In embodiments, functional tube 101 and sacrificial tube 103 are bonded to one another along an interface (e.g., interface 107) by a metallurgical bond. For example, functional tube 101 and sacrificial tube 103 may be diffusion bonded to one another along their length and along an interface (e.g., interface 107). In such instances, no voids, intermetallic compounds, or undesirable phases (e.g., brittle or corrosion resistant phases) are formed between the materials of functional tube 101 and sacrificial tube 103 along the interface 107.

Functional tube 101 and sacrificial tube 103 may have any suitable physical dimensions. As shown in FIG. 1, functional tube 101 may have a first outer diameter (OD1), a first inner diameter (ID1), and a first average wall thickness (WT1), and sacrificial tube 103 may have a second outer diameter (OD2), second inner diameter (ID2), and second average wall thickness (WT2). Such dimensions may be selected appropriately based at least in part on the configuration of the composite tube assembly 100. For example, in the embodiment of FIG. 1 OD1 is selected to be less than ID2, such that functional tube 101 may be disposed within sacrificial tube 103. Conversely in instances where a composite tube assembly is configured with a sacrificial tube disposed within a functional tube. ID1 is selected to be greater than OD2. In embodiments (and regardless of the configuration), OD1 is in the range of 0.25 to 3.5 millimeters (mm), such as from 0.5 to 3.2 mm, or even about 0.5 to 1.5 mm. In such instances. ID2 is greater than OD1 when sacrificial tube 103 is disposed around the functional tube 101, or ID2 is less than OD1 when sacrificial tube is disposed within the functional tube 101.

The functional tube 101 and sacrificial tube 103 may also have respective average wall thicknesses, WT1, WT2, as noted above. In this context, the term "average wall thickness" means the average of the thickness of the wall of a tube over length of the tube or around the circumference of the tube. WT1 may be selected to achieve desired physical and/or operational characteristics in a final product, and thus functional tube 101 may have any suitable WT1. Without limitation, in embodiments WT1 is in a range from greater than or equal to 20 μm to less than or equal to 300 μm, such as from greater than or equal to 25 μm to less than or equal to 250 μm, or even from greater than or equal to 25 μm to less than or equal to 75 μm. In embodiments, WT1 is in a range of 25 μm to 75 μm.

WT2 may be larger or smaller than WT1. In embodiments, WT2 ranges from one quarter of WT1 to five times WT1 (i.e., WT2=0.5(WT1) to 5(WT1)), such as from one half of WT1 to three times WT1 (i.e., WT2=0.5(WT1) to 3(WT1)). Without limitation, in embodiments WT1 ranges from 251p to 75 μm, and W2 ranges from 0.5 to 3 times WT1 (i.e., from 12 μm to 225 μm). In any case, a variation in the average wall thickness WT1 over the length or around the circumference of the composite tube assembly 101 may be less than or equal to 0.25(WT1), such as less than or equal to 0.2(WT1), less than or equal to 0.1(WT1), or even less than or equal to 0.05(WT1).

The composite tube assemblies described herein (and hence, their constitute sacrificial and functional tubes) may have any suitable length. For example, the composite tube assemblies described herein have a length of greater than or equal to 100 meters, such as greater than or equal to 250 meters, greater than or equal to 500 meters, greater than or equal to 900 meters, or even greater than or equal to 1000 meters, wherein the physical parameters of the sacrificial and functional tubes (i.e., WT1, WT2, variation of WT1, etc.) are within the above noted ranges. In embodiments, composite tube assembly 101 has a length of greater than or equal to 900 meters, wherein WT1 is in a range of 25 μm to 75 μm, and the variation in WT1 ranges is less than or equal to 0.25(WT1) (e.g., less than or equal to 0.2(WT1), less than or equal to 0.1(WT1), or even less than or equal to 0.05 (WT1).

As will be described in detail later in connection with the method of FIGS. 2A and 2B, the composite tube assembly 100 may be drawn until the functional tube 101 has achieved desired dimensions. Subsequently, the sacrificial tube 103 may be removed, e.g., by exposing it to a corrosive media. For example, the sacrificial tube 103 may be removed by immersing all or a portion of composite tube assembly 100 in a liquid corrosive media (e.g., 50% nitric acid, or the like), and/or flowing the corrosive media through the sacrificial tube. The processing parameters (e.g., immersion time, temperature, type of corrosive media, etc.) may vary depending on the nature of thickness of the second material of the sacrificial tube 103. In embodiments, removal of the sacrificial tube includes exposing (e.g., immersing) the composite tube assembly 100 in 50% nitric acid for about 30 minutes to about 6 hours (e.g., about 1 to 5 hours), at a temperature ranging from 40-80° C. (e.g., about 60° C.). In any case, removal of the sacrificial tube 103 preferably does not (or does not substantially) affect the functional tube 101. Following removal of the sacrificial tube 103, functional tube 101 may remain, and may exhibit no (zero) through the wall defects along the length of the tube.

Another aspect of the present disclosure relates to methods of making a tube. In that regard reference is made to FIGS. 2A and 2B, which are flow diagrams depicting example operations of one example of a method 200 of making a tube consistent with the present disclosure. For the sake of clarity and ease of understanding, the operations of method 200 will be described in with FIGS. 3A-3E, which stepwise illustrate one example of a process for producing a tube consistent with the present disclosure.

Figure 2A:
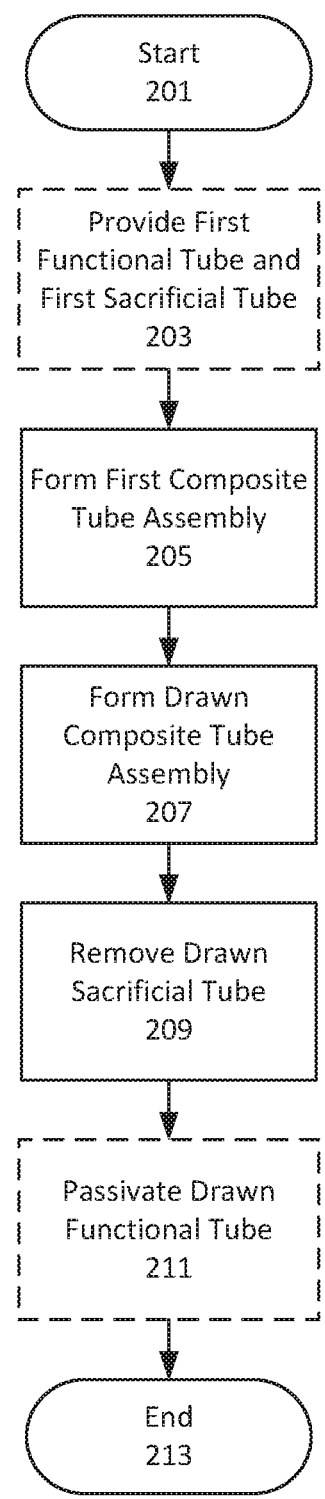
FIG. 2A is a flow diagram of example operations of one example of a method of forming a tube, consistent with the present diagram.

As shown in FIG. 2A, method 200 begins at block 201. The method may then proceed to optional block 203, pursuant to which a first functional tube and a first sacrificial tube may be provided. In this context, the first functional tube and first sacrificial tube may be understood as precursors or raw materials that will be formed (or otherwise incorporated) into a first composite tube assembly.

The first functional tube and first sacrificial tube may be provided in any suitable manner. For example, such tubes may be formed by gun drilling bar stock formed of or including the relevant first or second material(s) to provide seamless tube, i.e. a seamless first functional tube and a seamless first sacrificial tube. Alternatively or additionally, the first functional tube and/or first sacrificial tube may be provided by extruding and/or pilgering a first material and/or second material, again to provide seamless tube. Still further, the first functional and/or sacrificial tubes may be provided by providing a continuous strip of the first and/or second material, forming the strip to bring opposing edges thereof into proximity and/or contact with one another along a seam, and welding the seam to provide welded tube.

In any case, the seamless and/or welded tube may be drawn to produce first functional tube and first sacrificial tube with desired physical dimensions (outside diameter, insider diameter, wall thickness, etc.). For example and as shown in FIG. 3A, first functional tube 301 may have a first inside diameter ID1 and first outside diameter OD1, and the first sacrificial tube 3030 may have a second inside diameter ID2, and a second outside diameter OD2. Such drawing may be performed in any suitable manner, such as by mandrel drawing in straight lengths, tethered plug drawing in straight lengths, floating plug drawing in straight lengths, floating plug drawing in a coil (optionally followed by straightening and cutting), combinations thereof, and the like. Consistent with the above discussion, the physical dimensions of the first functional tube and the first sacrificial tube may be selected based on the configuration of the composite tube assembly that is to be formed, i.e., whether the first sacrificial tube is to be disposed inside or outside the first functional tube.

Of course, block 203 may be omitted in instances where the first functional tube and first sacrificial tube are obtained in some other manner (e.g., by purchase from a supplier). In any case, once the first functional tube and second functional tube have been provided (or if the operations of block 203 are omitted), method 200 may proceed to block 205, pursuant to which a first composite tube assembly may be formed.

Figure 2B:
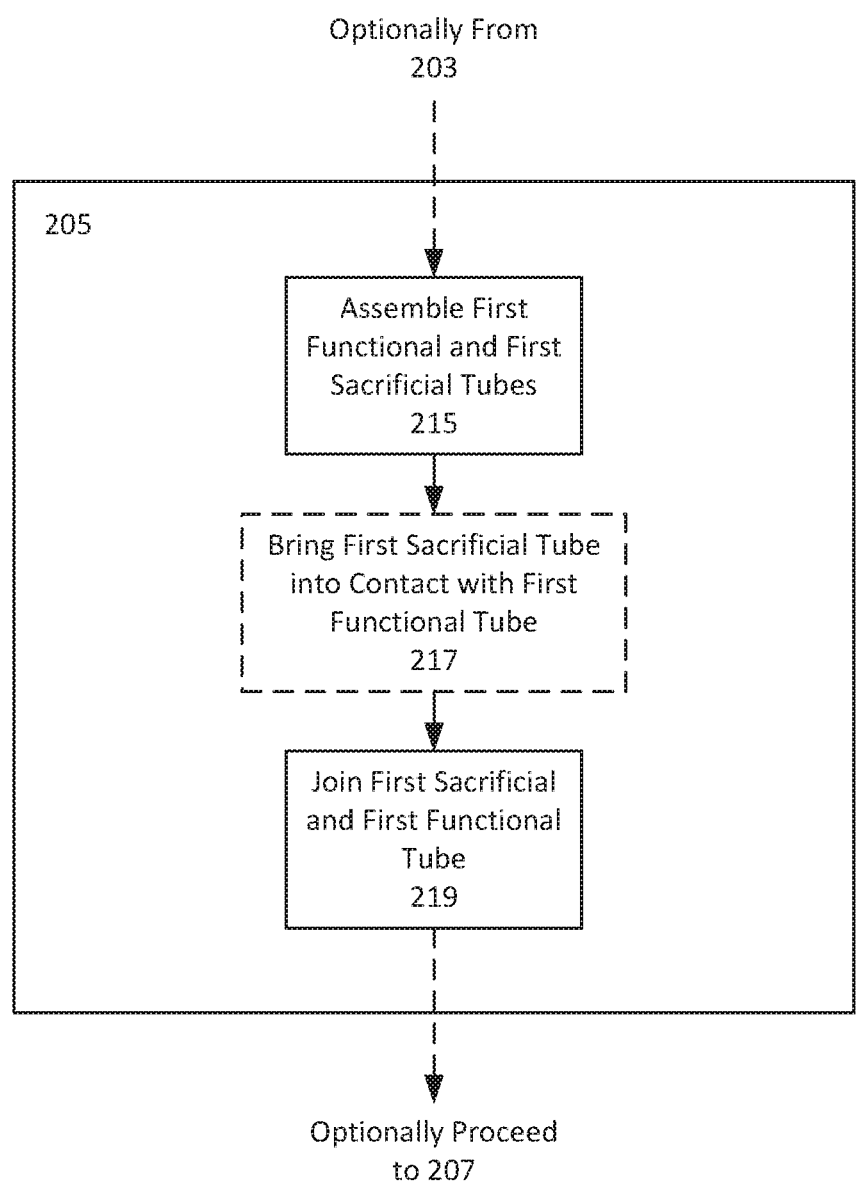
FIG. 2B is a flow diagram of additional example operations of a method of forming a composite assembly consistent with the present disclosure.

Attention is drawn to FIG. 2B, which depicts more detailed operations of block 205. As shown, the formation of a first composite tube assembly may begin with block 215, pursuant to which the first functional tube and first sacrificial tubes are assembled into a first composite tube assembly precursor. This may be accomplished in any suitable manner, e.g., by disposing the first sacrificial tube inside the first functional tube, or by disposing the first functional tube inside the first sacrificial tube.

That concept is shown in FIG. 3B, which depicts one example of a first composite tube assembly precursor 300, in which a first functional tube 301 is disposed within the interior volume of a first sacrificial tube 303. In such embodiments, the first sacrificial tube 303 has an inside diameter ID2 that is greater than the outside diameter OD1 of the first functional tube 301. Consequently, the first composite tube assembly precursor includes a gap 305 between the outer surface(s) of the first functional tube 301 and the inner surface(s) of the first sacrificial tube 303. In such instances and where first functional tube 301 and first sacrificial tube 303 are both cylindrical, the size of the gap 305 may correspond to a difference between ID2 and OD1.

As noted above, in embodiments the first sacrificial tube 303 may be disposed within the interior volume of the first functional tube 301. In such instances, the outer diameter OD2 of the first sacrificial layer will be less than the inner diameter ID1 of the first functional layer, and a gap 305 will be present between the outer surface of the first sacrificial tube and the inner surface of the first functional tube. Like the embodiment of FIG. 3B, when the first functional and sacrificial tubes are both cylindrical, the size of the gap 305 may correspond to a difference between OD2 and ID1.

Returning to FIG. 2B, once the operations of block 215 are complete the method 200 may proceed to optional block 217, pursuant to which a surface of the first sacrificial tube 303 may be brought into contact with a surface of the first functional tube 301, or vice versa, to produce a second composite tube precursor. Put differently, pursuant to block 217 operations may be performed to reduce or even eliminate the gap 305 between the first functional tube and the first sacrificial tube, such that the outside surface of whichever tube is on the inside of the first composite tube precursor is brought into contact with the inside surface of whichever tube is on the outside of the first composite tube precursor.

One example of that concept is shown by comparison of FIGS. 3B and 3C. More specifically, FIG. 3C depicts an embodiment in which gap 305 in first composite tube precursor 300 has been eliminated along its length, such that the outer surface of first functional tube 301 is in contact with the inner surface of the first sacrificial tube 303, resulting in second composite tube precursor 300' that includes an interface 307 between the first functional and sacrificial tubes 301, 303, wherein gap 305 is reduced or even eliminated. Put in other terms, in second composite tube precursor 300' the outer surface of the inner tube (i.e., first functional tube 301) is in contact with the inner surface of the outer tube (i.e., first sacrificial tube 303) along interface 307 and along the length of the second composite tube precursor 301'.

Reduction and/or elimination of the gap 305 may be performed in any suitable manner. In embodiments, gap 305 is reduced and/or eliminated by subjecting the first composite tube precursor 300 to a gap elimination process. The gap elimination process may involve inserting a mandrel into the interior diameter of the inner tube of the first composite tube precursor 300 or providing a straight fixed plug for drawing, and drawing the first composite tube precursor 300 through a drawing die that reduces the inside diameter of the outer tube to the outside diameter of the inner tube. In the embodiment of FIGS. 3B and 3C, for example, the first composite tube assembly precursor 300 may be drawn through a die to reduce ID2 of the first sacrificial tube 303 until ID2 equals or substantially equals OD 1 of the first functional tube 301. Although not shown, it may be understood that such drawing may result in a corresponding extension in length and, thus, second composite tube precursor 300' may be longer than first composite tube precursor 300. Of course, block 217 is not limited to such operations and the gap between the first sacrificial tube and the first functional tube may be reduced or eliminated in any suitable manner.

Following the operations of block 217 (or if such operations are omitted) the method may proceed to block 219, pursuant to which the first sacrificial tube and the first functional tube are joined, e.g., along an interface therebetween (e.g., along interface 307 in FIG. 3C). Such joining may be performed in any suitable manner. In embodiments, an annealing process is used to join the first sacrificial tube and the first functional tube. In general, the annealing process involves heating the second composite tube precursor for a sufficient time and at a sufficient temperature to produce a metallurgical bond (e.g., a diffusion bond) between the two tubes. For example, the annealing process may result in the formation of a diffusion bond between the first functional tube and the first sacrificial tube along an interface therebetween (e.g., interface 307). In embodiments, the first functional tube and first sacrificial tube are joined by a vacuum annealing process, in which the second composite tube precursor is heated to a temperature in the range of 900 to 1100° C. for 10 or more minutes, while under a vacuum (e.g., of less than or equal to 0.001 torr), so as to produce a diffusion bond between the first functional tube and first sacrificial tube along an interface therebetween. Notably, such annealing temperatures are lower than those typically used to anneal a superalloy, such as the example alloys noted above in Table 1.

In addition to joining the first functional tube and first sacrificial tube, the annealing process may also be configured to impart desired physical properties to one or more of the first and second materials. For example, the annealing process may be configured such that the first and second materials of the first functional and sacrificial layers, respectively, are ductile enough (e.g., ductility ≥15%) to be subsequently drawn to a desired length. The annealing process may also serve to regulate the variation in the wall thickness (WT1) of the first functional layer, such that the variation in the wall thickness is less than or equal to 20% (e.g., less than or equal to 10%, or even less than or equal to 5%).

Following the operations of block 219 a first composite tube assembly may be formed. One example of that concept is shown in FIG. 3C, which depicts a first composite tube assembly 301' that includes a first functional tube 301 joined to a first sacrificial tube 303. The method may then proceed to block 207, pursuant to which the first composite tube assembly is processed to form a drawn composite tube assembly. Formation of the drawn composite tube assembly may be accomplished in any suitable manner, such as via a drawing or a sinking process. For example, a drawn composite tube may be formed by drawing the first composite tube via mandrel drawing, fixed plug drawing, floating plug drawing, coil drawing, combinations thereof, and the like. In embodiments, a drawn composite tube assembly is formed by a plurality of drawing, degreasing, and annealing cycles until desired physical dimensions (e.g., inner diameter, outer diameter, etc.) of the functional tube are achieved. Each drawing, degreasing, and annealing cycle may include drawing the first composite tube (e.g., via coil drawing) using one or more lubricants (e.g., chlorinated parafins or olefins), degreasing the drawn composite tube to remove the lubricant(s), and annealing the drawn composite tube assembly, e.g., using a vacuum annealing process such as described above in conjunction with block 219.

Degreasing of the drawn composite tube assembly may be performed in any suitable manner, and in some embodiments is performed with a two-phase mixture of a solvent and a non-reactive gas. Suitable solvents that may be used for that purpose includes solvents that have low viscosity (e.g., a viscosity low enough to flow through the small interior diameter of the drawn composite tube) and which are able to dissolve and transport the lubricant from the tube ID) for the lubricant(s) used in tube drawing. Non-limiting examples of such solvents include trichloroethylene, n-propyl bromide, acetone, chlorinated hydrocarbon solvents, chloro fluorohydrocarbon solvents, combinations thereof, and the like. Suitable non-reactive gases include inert gases (e.g., helium, neon, argon, krypton, xenon, radon, and combinations thereof), hydrogen, carbon dioxide, nitrogen, combinations thereof, and the like.

Regardless of the type of solvent and non-reactive gas, the degreasing process may involve flushing the solvent through the inner diameter of the first composite tube assembly. Flushing of the solvent may occur under at a pressure ranging from 50 to 1,400 pounds per square inch (PSI; e.g., 80-1,200 PSI), and may be performed for a time ranging from 1 to 30 minutes (e.g., 3 to 20 minutes). Subsequently, the non-reactive gas may be blown through the interior volume of the first composite tube assembly to remove residual solvent. In embodiments, the non-reactive gas is blown under a pressure ranging from 50 to 1,400 PSI (e.g., 50-1,200 PSI) for a time ranging from 1 minute to 3 hours, such as from 5 minutes to 2 hours.

Figure 3D:
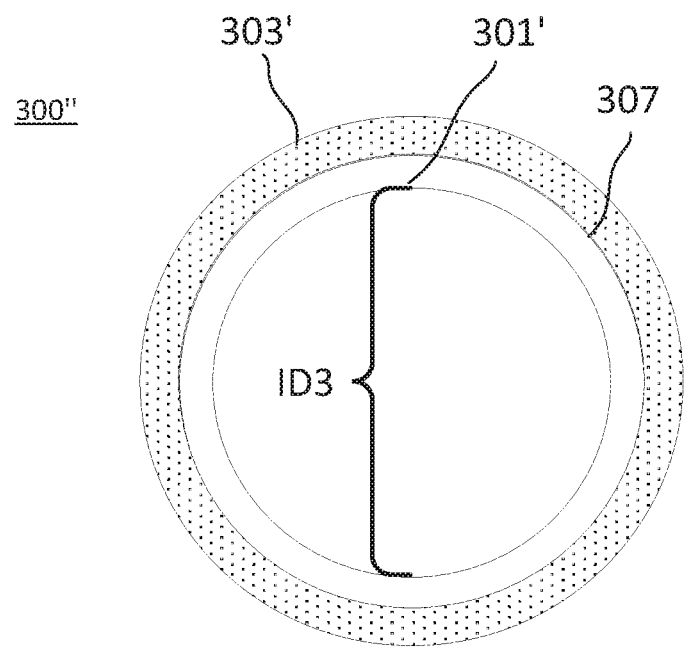

The drawn composite tube assembly may have physical dimensions that differ from the first composite tube assembly discussed above. For example, the length of the drawn composite tube assembly may be substantially longer than the length of the first composite tube assembly. Moreover, the inner and outer diameters of the drawn composite tube and/or drawn functional tube in the drawn composite assembly may differ from the corresponding dimensions of the first composite tube assembly. That concept is shown in FIG. 3D, which is a cross sectional view of one example of a drawn composite tube assembly 300" that includes a drawn functional tube 301' and a drawn sacrificial tube 303'. As shown, the drawn functional tube 301' has an inner diameter ID3, wherein ID3 may be the same as or different from ID1. In embodiments, ID3 is less than ID1. For example, ID3 may range from 0.75 to 0.02 Of ID1. The outer diameter of drawn functional tube 301' may differ similarly from the outer diameter of the functional tube 301 in the first composite tube assembly 301'.

Figure 3E:
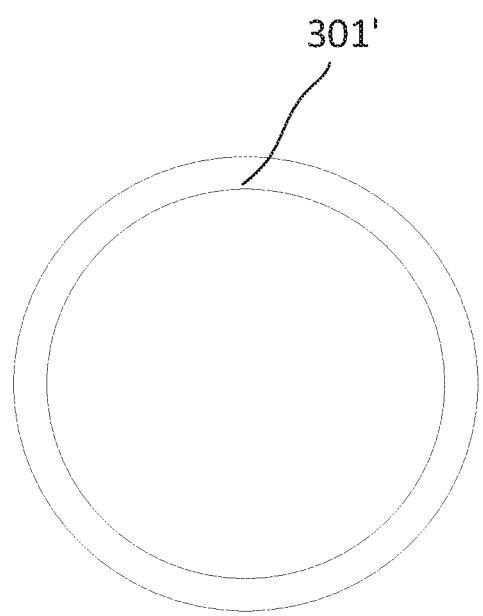

The method may then proceed to block 209, pursuant to which the sacrificial tube is removed. Removal of the sacrificial tube may be accomplished in any suitable manner, but is preferably accomplished by exposing the drawn composite tube assembly to a corrosive media, such as a corrosive liquid. For example, the sacrificial tube may be removed by immersing the composite tube assembly in a corrosive media and/or flowing a corrosive media through an interior diameter of the sacrificial tube. In such instances the corrosive media may be a strong or weak acid that attacks the material of the sacrificial tube, but does not or does not substantially affect the functional tube. In specific non-limiting embodiments, a drawn composite tube assembly may be exposed to nitric and/or phosphoric acid for enough time (e.g., 1 to 5 hours) and temperature (e.g., about 40 to 100° C.) to remove the sacrificial tube, while leaving the functional tube unaffected or substantially unaffected. This concept is shown in FIG. 3E, which depicts drawn functional tube 301' after drawn sacrificial tube 303' is removed with a corrosive media.

Following the operations of block 209 the method may proceed to optional block 211, pursuant to which one or more surfaces of the drawn functional tube may be passivated. In this context, passivation means that one or more surfaces of the drawn functional tube is chemically treated with a mild oxidant (e.g., a nitric acid solution), e.g., to removing free iron or other active metals from the surface thereof. In embodiments, the operations of block 211 may include treating the drawn functional tube with a nitric acid solution. In some instances the nitric acid solution may contain 20 to 25 volume % of nitric acid and 2.5+/−0.5 weight % of sodium dichromate, and the drawn functional tube is exposed to the solution for a minimum of 20 minutes at a temperature in the range of 49 to 54° C. In other instances the nitric acid solution contains 20 to 45 volume % of nitric acid, and the drawn functional tube is exposed to the solution for a minimum of 30 minutes at a temperature in the range of 21 to 32° C.

Following the operations of block 211 (or if block 211 is omitted), the method may proceed to block 213 and end.

EXAMPLES

The following examples are additional non-limiting embodiments of the present disclosure.

Example 1

According to this example there is provided a composite tube assembly, including: a functional tube formed of a first material, the functional tube having a first inner surface and a first outer surface: and a sacrificial tube formed of a second material, the sacrificial tube having a second inner surface and a second outer surface; wherein: the functional tube is disposed inside or outside the sacrificial tube: the first material includes a superalloy; and the second material is removable from the assembly by exposure to a corrosive media.

Example 2

This example includes any or all of the features of example 1, wherein the superalloy includes at least one of nickel, cobalt, and iron, and which: has a yield strength (YS) of at least 550 megapascals (MPa); has an ultimate tensile strength (UTS) of at least 1200 MPa: and in which one or more of said YS and said UTS is maintained at temperatures at or above 760° C., or at temperatures greater than or equal to 70% of the absolute melting temperature of the superalloy.

Example 3

This example includes any or all of the features of example 2, wherein the second material is selected from the group consisting of copper, a copper alloy, iron, an iron alloy, nickel, a nickel alloy, cobalt, a cobalt alloy, or a combination thereof.

Example 4

This example includes any or all of the features of example 1, wherein: the first material is a nickel superalloy, and the second material is thoria dispersed nickel; or the first material is a nickel superalloy, and the second material includes greater than or equal to 95% by weight of nickel.

Example 5

This example includes any or all of the features of example 1, wherein: the functional tube has a first outside diameter (OD1), the sacrificial tube has a second outside diameter (OD2); OD2>OD1; and OD1 is in the range of 0.5 to 3.2 millimeters (mm).

Example 6

This example includes any or all of the features of example 5, wherein OD1 ranges from 0.5 to 1.5 mm.

Example 7

This example includes any or all of the features of example 5, wherein the functional tube has a first average wall thickness (WT1), wherein WT1 ranges from 25 to 250 µm.

Example 8

This example includes any or all of the features of example 7, wherein: the sacrificial tube has a second average wall thickness (WT2); and WT2 ranges from 0.5(WT1) to 3(WT1).

Example 9

This example includes any or all of the features of example 7, wherein the functional tube has a wall thickness variation that is less than or equal to 10% of WT1.

Example 10

This example includes any or all of the features of example 1, wherein the first inner surface and the second outer surface are metallurgically bonded to each other.

Example 11

This example includes any or all of the features of example 1, wherein the first outer surface and the second inner surface are metallurgically bonded to each other.

Example 12

This example includes any or all of the features of example 1, wherein the corrosive media is selected from the group consisting of hydrochloric acid, hydrofluoric acid, nitric acid, phosphoric acid, sulphuric acid, or a combination thereof.

Example 13

According to this example there is provided a method of making a tube, including: forming a first composite tube assembly, the first composite tube assembly including: a first functional tube formed of a first material including a superalloy, the first functional tube having a first inner surface and a first outer surface; and a first sacrificial tube formed of a second material, the first sacrificial tube having a second inner surface and a second outer surface: wherein the first sacrificial tube is disposed inside or outside the first functional tube and is metallurgically bonded to the first functional tube; drawing the first composite tube assembly to form a drawn composite tube assembly including a drawn functional tube and a drawn sacrificial tube: and removing the drawn sacrificial tube.

Example 14

This example includes any or all of the features of example 13, wherein removing the drawn sacrificial tube includes exposing the drawn composite tube assembly to a corrosive media.

Example 15

This example includes any or all of the features of example 14, wherein the corrosive media is selected from the group consisting of hydrochloric acid, hydrofluoric acid, nitric acid, phosphoric acid, sulphuric acid, or a combination thereof.

Example 16

This example includes any or all of the features of 13, wherein forming the first composite tube assembly includes: providing the first functional tube and the first sacrificial tube; disposing the first sacrificial tube inside the first functional tube or disposing the first functional tube inside the first sacrificial tube: and metallurgically bonding the first sacrificial tube and the first functional tube.

Example 17

This example includes any or all of the features of example 13, wherein forming the first composite tube further includes, after disposing the first sacrificial tube inside the first functional tube or disposing the first functional tube inside the first sacrificial tube, drawing the first functional tube and the first sacrificial tube through a drawing die, such that the first outer surface is brought into contact with the second inner surface, or the first inner surface is brought into contact with the second outer surface.

Example 18

This example includes any or all of the features of example 16, wherein the metallurgically bonding includes annealing the first sacrificial tube and the first functional tube to cause diffusion bonding between the first material and the second material.

Example 19

This example includes any or all of the features of example 13, further including passivating the drawn functional tube.

Example 20

This example includes any or all of the features of example 13, wherein the superalloy includes at least one of nickel, cobalt, and iron, and which: has a yield strength (YS) of at least 550 megapascals (MPa): has an ultimate tensile strength (UTS) of at least 1200 MPa; and in which one or more of said YS and said UTS is maintained at temperatures at or above 760° C., or at temperatures greater than or equal to 70% of the absolute melting temperature of the superalloy.

Example 21

This example includes any or all of the features of example 20, wherein the second material is selected from the group consisting of nickel, a nickel alloy, cobalt, a cobalt alloy, or a combination thereof.

Example 22

This example includes any or all of the features of example 13, wherein: the drawn functional tube has a first outside diameter (OD1): the drawn sacrificial tube has a second outside diameter (OD2); OD2>OD1: and OD1 is in the range of 0.5 to 3.2 millimeters (mm).

Example 23

This example includes any or all of the features of example 23, wherein OD1 ranges from 0.5 to 1.5 mm.

Example 24

This example includes any or all of the features of example 23, wherein: the drawn functional tube has a first average wall thickness (WT1), wherein WT1 ranges from 25 to 250 μm; the sacrificial tube has a second average wall thickness (WT2); and WT2 ranges from 0.5(WT1) to 3(WT1).

Example 25

This example includes any or all of the features of wherein the functional tube has a wall thickness variation that is less than or equal to 10% of WT1.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method of making an end-product tube, comprising:
   forming a first composite tube assembly, the first composite tube assembly comprising:
      a first functional tube formed of a first material comprising a superalloy, the first functional tube having a first inner surface and a first outer surface; and
      a first sacrificial tube formed of a second material, the first sacrificial tube having a second inner surface and a second outer surface;
      wherein the first sacrificial tube is disposed inside or outside the first functional tube and is metallurgically bonded to the first functional tube;
   drawing the first composite tube assembly to form a drawn composite tube assembly comprising a drawn functional tube and a drawn sacrificial tube;
   removing the drawn sacrificial tube from the drawn functional tube to form the end-product tube such that the end-product tube has an overall length provided by the drawn functional tube.

2. The method of claim 1, wherein removing the drawn sacrificial tube comprises:
exposing the drawn composite tube assembly to a corrosive media.

3. The method of claim 2, wherein said corrosive media is selected from the group consisting of hydrochloric acid, hydrofluoric acid, nitric acid, phosphoric acid, sulphuric acid, or a combination thereof.

4. The method of claim 1, wherein forming the first composite tube assembly comprises:
disposing said first sacrificial tube inside the first functional tube or disposing said first functional tube inside the first sacrificial tube; and
metallurgically bonding the first sacrificial tube and the first functional tube.

5. The method of claim 4, wherein said metallurgically bonding comprises annealing said first sacrificial tube and said first functional tube to cause diffusion bonding between the first material and the second material.

6. The method of claim 1, wherein forming the first composite tube assembly comprises:
disposing said first sacrificial tube inside the first functional tube or disposing said first functional tube inside the first sacrificial tube, and
after disposing said first sacrificial tube inside the first functional tube or disposing said first functional tube inside the first sacrificial tube, drawing the first functional tube and the first sacrificial tube, such that the first inner surface and the second outer surface are brought into contact, or the first outer surface and the second inner surface are brought into contact.

7. The method of claim 1, further comprising passivating the drawn functional tube.

8. The method of claim 1, wherein the superalloy comprises at least one of nickel, cobalt, and iron, and which: has a yield strength (YS) of at least 550 megapascals (MPa); has an ultimate tensile strength (UTS) of at least 1200 MPa; and in which one or more of said YS and said UTS is maintained at temperatures at or above 760° C., or at temperatures greater than or equal to 70% of the absolute melting temperature of the superalloy.

9. The method of claim 8, wherein the second material is selected from the group consisting of nickel, a nickel alloy, cobalt, a cobalt alloy, or a combination thereof.

10. The method of claim 1, wherein:
the drawn functional tube has a first outside diameter (OD1);
the drawn sacrificial tube has a second outside diameter (OD2);
OD2>OD1; and
OD1 is in the range of 0.5 to 2.3 millimeters (mm).

11. The method of claim 10, wherein OD1 ranges from 0.5 to 1.5 mm.

12. The method of claim 11, wherein:
the drawn functional tube has a first average wall thickness (WT1), wherein WT1 ranges from 25 to 250 µm;
the drawn sacrificial tube has a second average wall thickness (WT2); and
WT2 ranges from 0.5(WT1) to 3(WT1).

13. The method of claim 12, wherein the drawn functional tube has a wall thickness variation that is less than or equal to 10% of WT1.

14. The method of claim 1, wherein the first sacrificial tube is disposed inside the first functional tube.

15. The method of claim 14, wherein forming the first composite tube assembly comprises:
disposing said first sacrificial tube inside the first functional tube; and
metallurgically bonding the first sacrificial tube and the first functional tube.

16. The method of claim 14, wherein forming the first composite tube assembly comprises:
disposing said first sacrificial tube inside the first functional tube; and
after disposing said first sacrificial tube inside the first functional tube, drawing the first functional tube and the first sacrificial tube, such that the first inner surface and the second outer surface are brought into contact.

17. The method of claim 1, wherein the first sacrificial tube is disposed outside the first functional tube.

18. The method of claim 17, wherein forming the first composite tube assembly comprises:
disposing said first sacrificial tube outside the first functional tube; and
metallurgically bonding the first sacrificial tube and the first functional tube.

19. The method of claim 17, wherein forming the first composite tube assembly comprises:
disposing said first sacrificial tube outside the first functional tube; and
after disposing said first sacrificial tube outside the first functional tube, drawing the first functional tube and the first sacrificial tube, such that the first outer surface and the second inner surface are brought into contact.

* * * * *